Aug. 28, 1962  G. A. LYON  3,051,529
WHEEL COVER
Filed Sept. 17, 1959  2 Sheets-Sheet 1
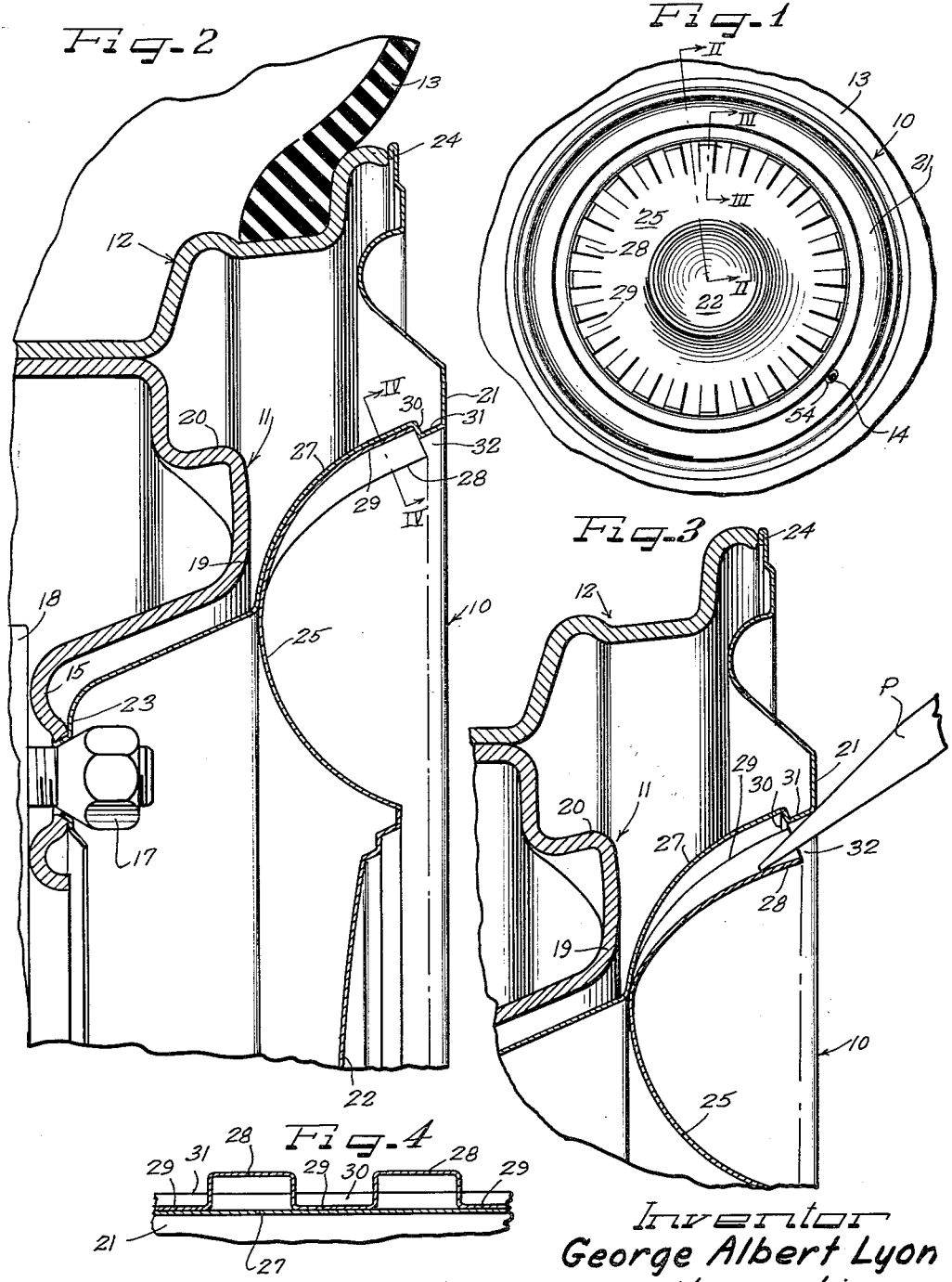
Inventor
George Albert Lyon Aug. 28, 1962  G. A. LYON  3,051,529
WHEEL COVER
Filed Sept. 17, 1959  2 Sheets-Sheet 2
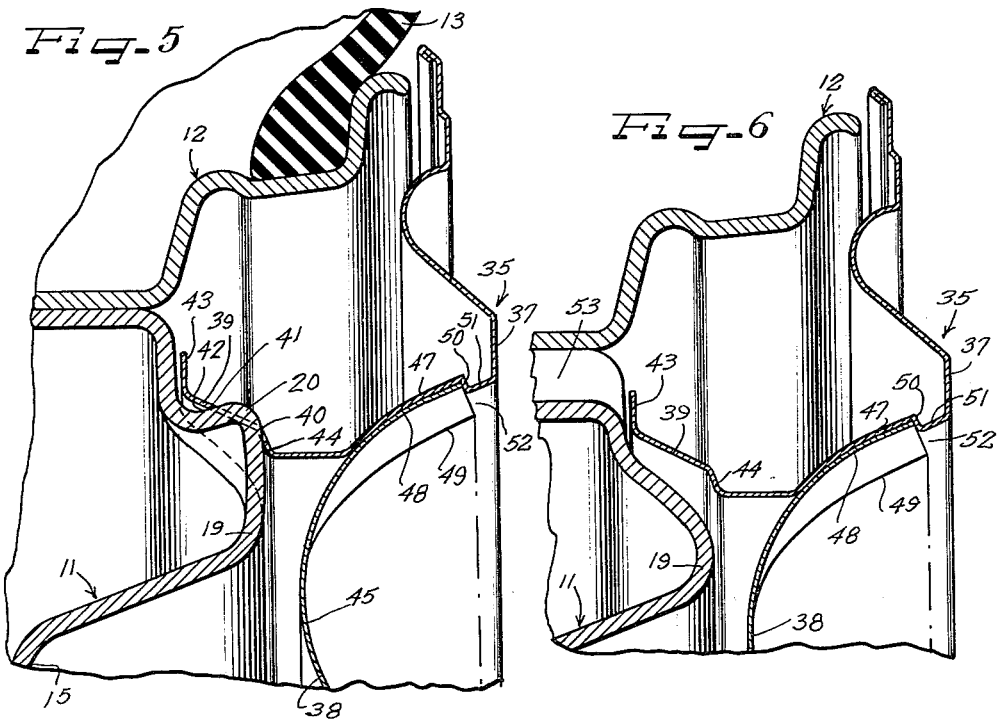
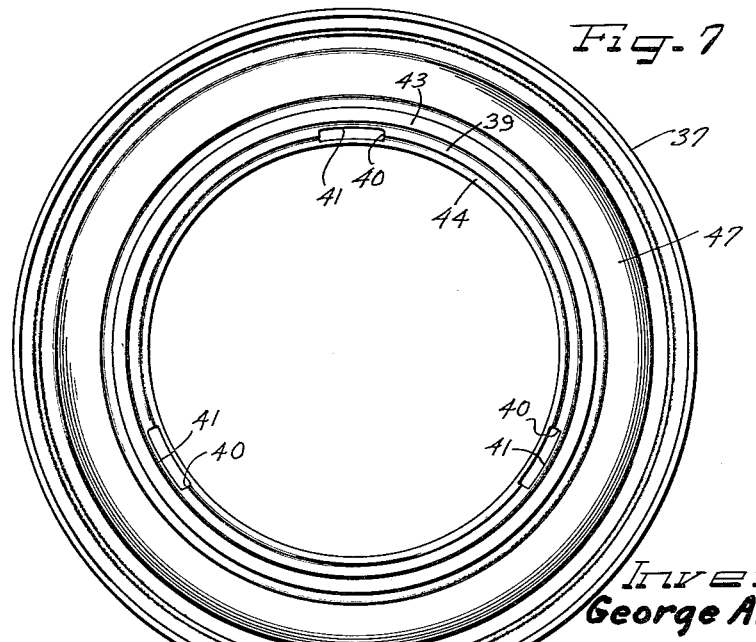
Inventor
George Albert Lyon
by Hill Sherman Meroni Gross & Simpson
Attys.

United States Patent Office 3,051,529
Patented Aug. 28, 1962

3,051,529
WHEEL COVER
George Albert Lyon, Detroit, Mich., assignor to Lyon Incorporated, Detroit, Mich., a corporation of Delaware
Filed Sept. 17, 1959, Ser. No. 840,725
16 Claims. (Cl. 301—37)

The present invention relates to improvements in wheel structures and more particularly concerns the ornamental and protective covering of the outer sides of vehicle wheels.

In the more expensive types of wheel cover, theft is an important problem, especially in areas where there is considerable activity in "dressing up" older models of automobile on which such wheel covers might be used.

It has been proposed to utilize special locking devices to preclude or discourage theft. However, such devices generally add a substantial element of cost, and are often an unbalancing factor, especially where they must be disposed eccentrically on the wheel.

It is accordingly an important object of the present invention to provide a new and improved wheel cover construction for automobile wheels embodying novel means for discouraging theft, such means affording part of the cover and maintaining desirable concentricity with respect to the wheel.

Another object of the invention is to provide in an improved wheel structure wherein a two-part cover has the components constructed and related to provide at least a substantial obstacle to stealing of the cover.

A further object of the invention is to provide an improved wheel structure including a cover which is so constructed and arranged as to impose a time delay factor in the removal thereof from the wheel, sufficient to discourage theft of the cover.

Another object of the invention is to provide a novel two-part cover wherein one of the cover parts is provided with means for attaching it to a wheel, and the other of the cover parts is engageable in press-on, pry-off relation with the one cover part and conceals the means whereby said one cover part can be removed from the wheel.

Still another object of the invention is to provide a novel cover assembly which is susceptible of desirable construction to afford a substantial latitude as to ornamental configuration at minimum manufacturing cost for a multi-part assembly.

Other objects, features and advantages of the present invention will be readily apparent from the following detailed description of certain preferred embodiments thereof taken in conjunction with the accompanying drawings, in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is a radial sectional view taken substantially on the line III—III of FIGURE 1;

FIGURE 4 is a fragmentary sectional detail view taken substantially on the line IV—IV of FIGURE 2;

FIGURE 5 is a radial sectional detail view similar to FIGURE 2 but showing a modification;

FIGURE 6 is a radial sectional detail view of the modification of FIGURE 5 but taken at a point on the cover circumferentially spaced from the section of FIGURE 5; and FIGURE 7 is a rear elevational view of the ring component of the cover assembly of FIGURES 5 and 6.

Referring to FIGURES 1-4, a wheel cover assembly 10 is constructed and arranged to be applied in covering, ornamental disposition over the outer side of a vehicle wheel including a disk spider wheel body 11 supporting concentrically thereabout a drop center multi-flange tire rim 12 constructed and arranged to support a pneumatic tire 13 of the tubeless type. The tire and tire rim together provide an air chamber adapted to be supplied with air through a valve stem 14 projecting from the outer side of the tire rim.

Centrally the wheel body 11 has a bolt-on flange 15 whereby by means of attachment bolts 17 of suitable number the wheel is detachably secured to a flange 18 on an axle structure of a vehicle such as an automobile. About the bolt-on flange the wheel body has an axially outwardly projecting annular nose bulge 19 which may be provided on its radially outer side with a circumferentially spaced series of retaining bumps 20 by which a hub cap or wheel cover may optionally be attached to the wheel.

Construction and arrangement of the wheel cover 10 is such that it may easily be applied over the outer side of the wheel, in protective, covering relation thereto, but presents some obstacle to removal, at least to the extent of requiring an interval of time such that furtive petty thieves are hindered and discouraged from stealing the covers from an automobile so equipped. To this end, the cover 10 comprises a component or cover member 21 adapted to be attached directly to the wheel, and a companion cover component or member 22 supported thereby and attachable thereto in press-on, pry-off relation and making it impossible to remove the cover member 21 until the cover member 22 has been separated from the cover member 21. To this end, the cover member 21 is constructed of generally ring shape dimensioned to overlie the wheel body 11 and the tire rim 12 about the usual central opening provided in the bolt-on flange 15, with a central inset bolt-on flange 23 of the cover member generally complementary to the bolt-on flange 15 of the wheel body and arranged to be attached thereto by the same wheel attachment bolts 17 by which the wheel is attached to the axle flange 18 of the vehicle. Radially outwardly from the bolt-on flange 23, the cover member 21 overlies the wheel nose bulge 19 in spaced relation and extends to a radially outer margin which overlies the tire rim 12 and has an underturned reinforcing and finishing edge flange 24. In a practical form the wheel cover member 21 may be made as a sheet metal stamping of suitable gauge stainless steel, brass, aluminum, or like sheet metal susceptible of suitable finish.

According to the present invention, the cover member 22, which is also adapted to be made from suitable sheet metal stamped or drawn to shape, is constructed and arranged to be assembled in press-on, pry-off relation with the central portion of the cover member 21 as a closure cap concealingly overlying the bolt-on flange 23 and the attachment bolts 17 so as to preclude access to the bolts 17 until the cover member 22 is separated from the cover member 21. To this end, the cover member 22 comprises a desirably centrally configurated disk having a generally dished annular marginal portion 25 which in the radially outer part thereof is formed to project generally radially and axially outwardly complementary to an annular intermediate generally radially inwardly and axially outwardly facing portion 27 of the cover member 21, in the present instance arranged to overlie the nose bulge 19 of the wheel body.

Means are provided for snap-on, pry-off interengagement of the cover members 21 and 22. For this purpose, the outer marginal portion of the dished part 25 of the cover member 22 is formed into a series of circumferentially spaced radially and axially outwardly extending respective radially inner and radially outer corrugation ribs 28 and 29. The outer ribs 29 are part of the margin of the cover 22 nestably engaging with the intermediate supporting cover annular portion 27. All of the ribs 28 and 29 run out at the edge of the cover member 22. In a desirable arrangement, the ribs 28 and 29 taper toward their inner ends to merge into a common plane with the axially innermost part of the dished portion 25 of the cover 22. Thereby, the marginal extremity of the cover 22 is substantially stiffened by the maximum depth of the ribs 28 and 29 and the margin of the cover member 22 is progressively more resiliently flexible substantially as the ribs diminish in depth. This provides a desirable advantageous relationship with respect to a generally radially and axially inwardly facing retaining shoulder 30 which in the assembly substantially interlockingly opposes the ends of the cover ribs 28 and 29. Substantially stiff reinforcement of the cover member 21 is afforded by having the retaining shoulder 30 at the axially inner side of an annular reinforcing rib 31 defined by a radially inner oblique axially and radially inwardly sloping lead-in surface 32.

In assembling the cover 10 with the outer side of the wheel, the cover member 21 separate from the cover member 22 is secured in place when at least some of the attachment bolts 17 of the wheel assembly are applied in attaching the wheel to the axle flange 18. After all of the attachment bolts 17 have been fully tightened, the cover member 22 is assembled with the cover member 21. This is effected by generally centering the cover member 22 over the center of the cover member 21 and pressing axially inwardly on the cover member 22. As a result, the outer end portions of the marginal ribs 29 engage against the cam face 32 and are resiliently deflected radially inwardly from the normally larger diameter to which they project. At the same time, of course, the intermediate marginal ribs 28 are also deflected radially inwardly under resilient tension. As axially inward movement of the cover 22 progresses, the tips of the marginal ribs 29 pass the radially inner side of the shoulder 30 and snap radially outwardly behind the shoulder under the resilient tension imposed by the radially inward compression and contraction of the cover margin as it cams on the cam surface 32 in the course of the inward pressing of the cover 22.

By having the retaining shoulder 30 slant axially inwardly and radially substantially as shown ample clearance is afforded for the tips of the finger-like marginal cover ribs 29 to move in behind the shoulder 30 just before the cover marginal portion 25 seatingly engages against the intermediate cover portion 27 in the final assembled disposition or relationship of the cover members. Furthermore, by virtue of the oblique opposing relationship to the tips of the retaining finger ribs 29, a generally axially inward camming action is afforded to thrust the retaining ribs 29 generally axially inwardly for thrusting the intermediate cover portion 25 and more particularly the part thereof comprising the longitudinal seating surfaces of the ribs 29 firmly against the opposing axially outer surface of the intermediate cover portion 27 upon which the cover member 22 is supported. In the fully assembled relationship of the cover members, there is a snug fit of the engaged portions, or at least a tensioned engagement of the retaining finger ribs 29 with the opposed surfaces of the supporting cover member 21.

In the fully assembled relationship of the cover members 21 and 22, access to the bolt-on flange 23 is precluded until the cover member 22 is removed from its concealing, protective relation thereto. Such removal may be effected as depicted in FIGURE 3 by means of a pry-off tool P such as a screwdriver the tip of which is adapted to be inserted into successive ones of the generally axially outwardly opening channel ends provided by the marginal ribs 28 of the inner cover member 22 exposed radially inwardly from the reinforcing rib 31 of the supporting cover member 21. Application of leverage by the pry-off tool fulcrumed against the axially outer side of the annular rib 31 serving for this purpose as a pry-off tool shoulder forces the inner cover margin resiliently flexibly generally radially inwardly as depicted until the retaining tips of the cover marginal ribs 29 in the vicinity of the pry-off tool leverage force are swung clear of the oblique retaining shoulder 30, the angle of the shoulder 30 being such that the axially outermost end portion is offset sufficiently axially outwardly relative to the axially innermost end retaining portion to enable free clearance therepast of the retaining rib tips during pry-off. After the retaining rib tips have cleared the shoulder 30 continuing pry-off leverage exerts an axially outward component of pry-off force which moves at least the adjacent edge of the cover member 22 axially outwardly beyond the retaining shoulder 30. In the initial phases of pry-off, it may be necessary to apply pry-off leverage to a succession of circumferentially spaced points about the periphery of the cover member 22, that portion of the cover to which pry-off leverage is applied in each such instance lying frictionally against the oblique rib surface 32 and being temporarily held thereby against slipping back toward the retained condition with respect to the shoulder 30. When at least slightly over half of the periphery of the cover 22 has been released from the shoulder 30, the remaining periphery will fall away or can be lifted away from the shoulder 30 by radial release movement and the cover 22 carried away from the cover 21. However, up to this point only one of the components of the cover assembly, namely the cover 22 has been removed from the wheel. It then requires the use of a wrench to remove the retaining bolts 17 from their retaining engagement with the supporting cover member 21.

It will thus be apparent that while the cover assembly 10 is not theft proof, it does present an obstacle to petty thievery since it requires two separate cover removing actions providing a time lag interval for removal of the cover assembly from the wheel which at least makes this cover unattractive to the furtive sneak thief. In addition, of course, the cover 10 places another obstacle in the thief's path in that two separate tools or tool portions are required for removal of the entire assembly. On the other hand, for legitimate purposes, removal of the cover is reasonably convenient, especially since modern wheel and tire equipment are such as to avoid need for removal of the cover or the wheel except at infrequent intervals.

In the modification of FIGURES 5–7, a cover assembly 35 is provided which in general respects is similar to the cover assembly 10, comprising a two-part assembly including a wheel attachable component or member 37 and a supported, closing cover component member 38. This form of cover assembly 35 may be applied alternatively to the same wheel as the cover assembly 10, in this instance, however, providing for retention of the cover assembly on the wheel by the retaining bumps 20.

While the supported closure cover plate member 38 may be substantially the same if not identical with the cover member 22 already described, the cover member 37 is modified so that although it is of generally ring form it has its inner margin in the form of a generally axially inwardly and radially outwardly extending oblique flange of a diameter at variance with the diameter about the tips of the retaining protrusion bumps 20 and provided at intervals complementary to the retaining bumps with bump receiving pocket areas or openings 40 defined at the axially inner sides thereof by respective cover retaining shoulder edges engageable in press-on, pry-off relation with axially inwardly and radially outwardly facing generally undercut retaining shoulders 42 of the retaining bumps 20.

As will be observed in FIGURE 5, the axially inner and radially outermost portion of the annular flange 39 is on a larger diameter than the diameter about the tips of the bumps 20, while the radially innermost portion of the flange 39 is on a substantially smaller diameter than the tips of the retaining bumps so that although during application of the cover member 37 to the outer side of the wheel, the radially outermost portion of the flange 39 serves as a lead-in cam surface beyond the retaining shoulder edges 41, the radially innermost portion of the flange will seat upon the axially outer or crown portions of the retaining bumps 20.

At its terminus, the flange 39 has an angular radially outwardly projecting narrow reinforcing flange 43, which enhances resilient flexibility of the flange.

At its axially outer and radially inner end, the flange 39 has a turned generally axially inwardly facing narrow seating and pry-off shoulder flange portion 44 seating on the crowns of the bumps 20 but intermediate the bumps in spaced relation to the nose bulge 19 as best seen in FIG. 6. This affords a firm seating of the cover on the wheel but facilitates insertion of a pry-off tool such as a screwdriver or the like behind the shoulder flange portion 44 for prying the flange 39 free from the retaining bumps 20.

In applying the cover member 37 to the outer side of the wheel, one or more of the bump receiving apertures 40 may be generally registered with corresponding bumps and then the cover member pressed axially inwardly to snap the flange 39 over the remaining retaining bump. In view of the fact that the retaining flange 39 must flex resiliently in a generally radially outward direction during pry-off, and the flange 39 extends in a generally radially outward direction, while the axially outer and radially outwardly projecting wheel covering portion of the cover 37 behind which the flange 39 is generally disposed is located in overlying relation to the tire rim in such a manner that any axially outward force on the outer margin of the cover only tends to effect, if anything, a more secure retention of the retaining shoulder edges 41 with the retaining bump shoulders, it is necessary in order to effect pry-off to approach the cover member 37 from the radially inner side thereof toward the pry-off shoulder 44. This precludes removal of the cover from its outer edge.

The assembled relationship, as well as application and removal of the inner covering cover member 38 with respect to the supporting cover member 37 is substantially the same as has been described for the cover assembly 10. Accordingly, the inner cover member 38 has an annular inwardly dished marginal portion 45 which in the outer part thereof is engageable in nested relation with a complementary annular dished intermediate portion 47 of the cover 37. Alternate radially outer finger ribs 48 and radially inner ribs 49 on the margin of the cover member 38 are resiliently flexible to enable engagement of the tips of the fingers 48 behind a retaining shoulder 50 at the axially inner side of a reinforcing annular rib 51 of the cover member 37 defined on its radially inner side by a generally radially and axially inwardly oblique cam surface 52. Application of the cover member 38 and removal thereof with respect to the cover member 37 is the same as described in connection with the cover members 21 and 22 and description of the function of the retaining finger ribs 48 and the alternate intermediate ribs 49 relative to the shoulder 50 and the rib 51 in respect both to mounting of the cover member 38 and removal thereof is the same as described for the cover member 22.

In addition to their function in assisting resilient flexibility of the inner cover member margin and providing pry-off tool entry channels opening outwardly adjacent to the reinforcing and retaining and pry-off rib 51, the channels defined by the marginal ribs 49 in this instance open inwardly into the space behind the cover member 38 and thus afford heat exhaust passages from the hub portion of the wheel. Since the channels within the ribs 49 are directed generally radially and axially outwardly, centrifugal force will tend to avoid entry of dirt into the chamber closed by the cover member 38.

The cover 35 also lends itself to a disposition with respect to the wheel enabling circulation of cooling air through wheel openings 53 between the wheel body 11 and the tire rim 12 and between the terminal flange and the outer margin of the cover member 37 which as shown may be supported in spaced gap relation to the terminal flange.

Inasmuch as it is impossible to remove the cover assembly 35 from the outer side of the wheel except by gaining access to the pry-off shoulder 44 of the supporting cover member, it is necessary for such removal of the cover to remove the inner supported cover member 38 from the cover member 37, and this provides a time delay impediment to petty thievery, similarly as described in connection with the cover 10.

However, one advantage of the cover assembly 35 relative to the cover assembly 10 is that mounting of the cover assembly on the wheel may be effected after the cover members 37 and 38 have already been assembled and attached to one another, since no attachment tool is required to effect snap-on interengagement of the cover flange 39 with the retaining bumps. In other words, after the cover members 37 and 38 have been assembled together, the assembly can be mounted on the wheel by registration of the retaining bumps 20 with the openings 40 in the retaining flange 39 and then press-on force applied to the outer side of the cover member 37.

After the cover assembly 10 has been attached to the wheel, the cover is, of course, held fixedly against any torsional or turning displacement relative to the wheel by the bolts 17 so that a valve stem aperture 54 in the cover member 21 is maintained in fixed registration with the valve stem 14. Similarly, the cover assembly 35 is held against any torsional displacement relative to the wheel by opposition of the circumferential sides of the apertures 40 relative to the circumferential sides of the bumps 20 which hold the cover against turning.

It will be understood that modifications and variations may be effected without departing from the scope of the novel concepts of the present invention.

I claim as my invention:

1. In a wheel structure including a wheel assembly having means thereon for retaining a cover in place, a cover assembly including a member having means engageable retainingly with said wheel means, and a second cover member related to said first mentioned cover member to conceal said cover means, said cover members having interlocking structure for retaining the cover members in assembled relation, said interlocking structure comprising a generally axially facing shoulder on one of the cover members and a generally oppositely axially projecting annular edge on the other of the cover members with spaced segments of the annular edge coacting with the shoulder in press-on, pry-off relation and having a portion providing an axially outwardly opening pry-off tool gap between the cover members into which a pry-off tool is adapted to be inserted for freeing said edge from said shoulder.

2. In a wheel structure including a wheel assembly having means thereon for retaining a cover in place, a cover assembly including a member having means engageable retainingly with said wheel means, and a second cover member related to said first mentioned cover member to conceal said cover means, said cover members having interlocking structure for retaining the cover members in assembled relation, said interlocking structure comprising a generally axially facing shoulder on one of the cover members and a generally oppositely axially projecting annular edge on the other of the cover members with spaced segments of the annular edge coacting with the shoulder in press-on, pry-off relation and having spaced segments providing pry-off tool gaps between the cover members into which a pry-off tool is adapted to be inserted for freeing said edge from said shoulder, said wheel means comprising cover retaining protrusions and said cover means comprising a flange having retaining shoulder edges thereon engageable in press-on, pry-off relation with said protrusions.

3. In a wheel structure including a wheel body having a central bolt-on flange for attachment to a vehicle axle structure by means of attachment bolts, a cover assembly for disposition over the outer side of the wheel including a cover member having a bolt-on flange by which such cover member is attachable to the wheel by means of said bolts, and a cover plate member constructed to concealingly overlie said bolt-on flange and having a generally radially and axially outwardly facing edge, said first mentioned cover member having a generally axially inwardly facing shoulder thereon retainingly engaged in edgewise biting relation by the edge of said cover plate member in press-on, pry-off relation.

4. In a wheel structure including a wheel body having a nose bulge provided with radially outwardly projecting retaining bumps, a cover assembly for disposition over the outer side of the wheel including a first cover member having a radially inner flange portion provided with circumferentially spaced retaining shoulders engageable in press-on, pry-off relation with said bumps and having a pry-off shoulder adjacent to said retaining flange portion, and a second cover member for concealingly overlying said pry-off shoulder and having a generally radially and axially outwardly projecting radially outer margin engaging the first cover member, said first cover member having a shoulder thereon engageable in press-on, pry-off relation with the edge of said margin, said second cover member being adapted to be pried free from the first cover member in order to gain access to said pry-off shoulder.

5. In a cover assembly for disposition over the outer side of a vehicle wheel, a first cover member having a generally axially facing shoulder, and a second cover member having a resiliently flexible margin provided with an edge directed in the opposite axial direction from said shoulder and engageable therewith in press-on, pry-off relation to sustain said first and second cover members in assembly with one another and with said flexible margin having circumferentially spaced segments free of said shoulder defining axially opening gaps to enable the cover members to be separated.

6. In a cover assembly for disposition over the outer side of a vehicle wheel, a first cover member having a generally axially facing shoulder, and a second cover member having a resiliently flexible margin provided with an edge directed in the opposite axial direction from said shoulder and engageable therewith in press-on, pry-off relation, said edge having means providing an axially outwardly opening gap between the cover members within which a pry-off tool is adapted to be engaged for prying said edge from said shoulder.

7. In a cover assembly for disposition over the outer side of a vehicle wheel, a first cover member having a generally axially facing shoulder, and a second cover member having a resiliently flexible margin provided with an edge directed in the opposite axial direction from said shoulder and engageable therewith in press-on, pry-off relation, said edge comprising a series of alternate radially inward and radially outward corrugation-like ribs with certain of said ribs providing shoulder engaging edge and others of the ribs providing gaps within which a pry-off tool may be inserted for separating the cover members.

8. In a cover assembly for disposition over the outer side of a vehicle wheel, a radially outer cover member having an annular dished portion defined by a generally axially facing shoulder on an axially outer side, and a second cover member having a complementally dished portion seating in said first mentioned dished portion axially inwardly of said shoulder and having an axially outwardly extending portion provided with an edge engageable in retaining relation with said shoulder.

9. In a cover assembly for disposition over the outer side of a vehicle wheel, a cover member having an annular dished portion defined by a generally axially facing shoulder on one side, and a second cover member having a complementally dished portion seating in said first mentioned dished portion and having an edge engageable in retaining relation with said shoulder, said edge comprising a series of corrugation-like ribs with certain of said ribs providing shoulder engaging edges and others of the ribs providing pry-off tool gaps into which a pry-off tool is adapted to be inserted for prying said edge free from said shoulder.

10. In a wheel structure including a circular cover member having an outer marginal portion for overlying a wheel and an inner marginal portion having a flange for attachment to a wheel, said cover member having an intermediate inwardly dished portion provided with a radially outer and generally axially inwardly facing shoulder, and a second cover member for overlying and concealing the radially inner portion of said first mentioned cover member and having a radially outer margin dished in complementary relation and seated in said dished portion of the first mentioned cover member and having an edge retainingly engaged with said shoulder.

11. In a wheel structure including a circular cover member having an outer marginal portion for overlying a wheel and an inner marginal portion having a flange for attachment to a wheel, said cover member having an intermediate inwardly dished portion provided with a radially outer and generally axially inwardly facing shoulder, and a second cover member for overlying and concealing the radially inner portion of said first mentioned cover member and having a radially outer margin dished in complementary relation and seated in said dished portion of the first mentioned cover member and having an edge retainingly engaged with said shoulder, said shoulder being disposed on an oblique angle and having an entry end offset relative to a retaining end so that said edge can snap into engagement behind the shoulder on assembling the cover members and can be freed from said shoulder by flexing the edge away from said shoulder and past said entry portion of the shoulder.

12. In a cover assembly for disposition over the outer side of a vehicle wheel, a first cover member having a generally radially projecting annular rib providing a generally axially inwardly facing annular shoulder, and a second cover member having a resilient margin engaging the first cover member and provided with an edge that engages retainingly behind said shoulder, said edge having an offset portion defining a gap opening adjacent to said rib into which a pry-off tool is adapted to be inserted for leverage on said rib to pry said edge free from said shoulder.

13. A cover structure including a circular cover member having an outer marginal portion for overlying a wheel and an inner marginal portion, said cover member having an inwardly dished portion disposed radially inwardly of its outer marginal portion and provided with a radially outer and generally axially inwardly facing shoulder, and a second cover member having a radially outer margin dished in complementary relation and seated in said dished portion of the first mentioned cover member and having an edge retainingly engaged with said shoulder, said shoulder being disposed on an oblique angle and having an entry end offset relative to a retaining end so that said edge can snap into engagement behind the shoulder on assembling the cover members and can be freed from said shoulder by flexing the edge away from said shoulder and past said entry portion of the shoulder.

14. A cover structure including a circular cover member having an outer marginal portion for overlying a wheel and an inner marginal portion, said cover member having an inwardly dished portion disposed radially inwardly of its outer marginal portion and provided with a radially outer and generally axially inwardly facing shoulder, and a second cover member having a radially outer margin dished in complementary relation and seated in said dished portion of the first mentioned cover member and having an edge retainingly engaged with said shoulder, said shoulder being disposed on an oblique angle and having an entry end offset relative to a retaining end so that said edge can snap into engagement behind the shoulder on assembling the cover members and can be freed from said shoulder by flexing the edge away from said shoulder and past said entry portion of the shoulder, the edge on the second cover member being undulated so that circumferentially spaced segments of said edge provide means for engagement with said shoulder and so that other circumferentially spaced segments of said edge provide pry-off edge means 15. A cover structure including a circular cover member having an outer marginal portion for overlying a wheel and an inner marginal portion, said cover member having an inwardly dished portion disposed radially inwardly of its outer marginal portion and provided with a radially outer and generally axially inwardly facing shoulder, and a second cover member having a radially outer margin dished in complementary relation and seated in said dished portion of the first mentioned cover member and having an edge retainingly engaged with said shoulder, said second cover member having a retaining edge snapped into engagement behind the shoulder on assembling the cover members whereby the retaining edge can be freed from said shoulder by flexing the edge away from said shoulder.

16. A cover structure including a circular cover member having an outer marginal portion for overlying a wheel and an inner marginal portion, said cover member having an inwardly dished portion disposed radially inwardly of its outer marginal portion and provided with a radially outer and generally axially inwardly facing shoulder, and a second cover member having a radially outer margin dished in complementary relation and seated in said dished portion of the first mentioned cover member and having an edge retainingly engaged with said shoulder, said second cover member having a retaining edge snapped into engagement behind the shoulder on assembling the cover members, the edge on the second cover member being undulated so that circumferentially spaced segments of said edge provide means for engagement with said shoulder and so that other circumferentially spaced segments of said edge are free of said shoulder and provide means against which a pry-off tool may be levered to free said second cover member from retained assembly with said shoulder.

References Cited in the file of this patent

UNITED STATES PATENTS

| | | |
|---|---|---|
| 2,279,334 | Lyon | Apr. 14, 1942 |
| 2,434,940 | Lyon | Jan. 27, 1948 |
| 2,525,816 | Lyon | Oct. 17, 1950 |
| 2,650,135 | Lyon | Aug. 25, 1953 |
| 2,767,029 | Lyon | Oct. 26, 1956 |
| 2,828,159 | Lyon | Mar. 25, 1958 |
| 2,860,012 | Lyon | Nov. 11, 1958 |